United States Patent [19]

Denzin

[11] 4,348,249

[45] Sep. 7, 1982

[54] WELL SIDES IN LETTER FEEDING AND LETTER SEALING MACHINES

[75] Inventor: Horst Denzin, Berlin, Fed. Rep. of Germany

[73] Assignee: Francotyp GmbH, Berlin, Fed. Rep. of Germany

[21] Appl. No.: 208,492

[22] Filed: Nov. 19, 1980

[30] Foreign Application Priority Data

Nov. 30, 1979 [DE] Fed. Rep. of Germany ... 7934228[U]

[51] Int. Cl.$^3$ .......... B29H 9/00

[52] U.S. Cl. .......... 156/442.2; 271/171

[58] Field of Search .......... 156/442.2; 271/169, 271/170, 171, 145, 149

[56] References Cited

U.S. PATENT DOCUMENTS 2,233,730 3/1941 Britton .......... 271/171 X 3,378,252 4/1968 Springer .......... 271/170

4,032,136 6/1977 Komaba et al. .......... 271/171 X

*Primary Examiner*—David A. Simmons

*Attorney, Agent, or Firm*—Herbert L. Lerner; Laurence A. Greenberg

[57] ABSTRACT

Movable, hinged and removable well sides for letter feeding and letter sealing machines, including a table having first guide slots formed therein, an angular well side having a leg with two ends and a second guide slot formed in vicinity of an end of the leg, a stop forming another well side and being guidable at least partially in the second slot at a right angle to the leg, two angled-off webs being integral with an end of the leg opposite the second guide slot, projections being integral with the webs and guidable in the first guide slots, and a screw element being attached to the leg and having a pin and a washer for guiding and locking the angular well side and the stop on the table, the table having a hole formed therein along one of the first guide slots through which the washer is liftable for folding down the angular well side and the stop and through which the web is liftable for removing the angular well side and the stop.

2 Claims, 3 Drawing Figures

WELL SIDES IN LETTER FEEDING AND LETTER SEALING MACHINES

The invention relates to well sides in letter feeding and letter sealing machines, which are adjustable, hinged and removable.

In letter feeding and letter sealing machines, a stack of letters with the same external dimensions are placed in a well from which a conveyer device draws off the letters individually. It must be possible to adapt this well to different letter formats. It is known to make two well walls adjustable for this purpose. When placing letters manually against the conveyer device, the adjustable well walls are in the way and are therefore made to be removable, which is the only way to stop them from interfering.

It is accordingly an object of the invention to provide well sides in letter feeding and letter sealing machines which overcome the hereinafore-mentioned disadvantages of the heretofore-known devices of this general type, and to provide a movable construction of the well walls so that it permits simultaneous folding-under of the walls below the placement plane of the feeding or sealing machine, as well as the complete removal of both walls.

With the foregoing and other objects in view there is provided, in accordance with the invention, movable, hinged and removable well sides for letter feeding and letter sealing machines, comprising a table having first guide slots formed therein, an angular well side having a leg with two ends and a second guide slot formed in vicinity of an end of the leg, a stop forming anchor well side and being guidable at least partially in the second slot at a right angle to the leg, two angled-off webs being integral with an end of the leg opposite the second guide slot, projections being integral with the webs and guidable in the first guide slots, and a screw element being attached to the leg and having a pin and a washer for guiding and locking the angular well side and the stop on the table, the table having a hole formed therein along one of the first guide slots through which the washer is liftable for folding down the angular well side and the stop and through which the web is liftable for removing the angular well side and the stop.

In accordance with another feature of the invention, the leg is extended from the angular well side at an angle of less than 90°.

Other features which are considered as characteristic for the invention are set forth in the appended claims.

Although the invention is illustrated and described herein as embodied in well sides in letter feeding and letter sealing machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

In all of the figures, the same shapes and parts are provided with the same reference symbols.

Figure 1:
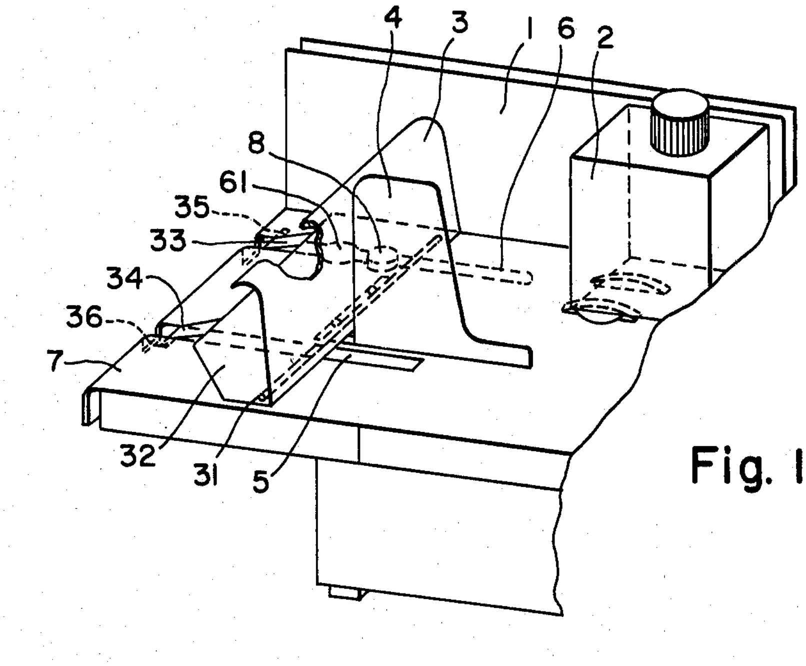
FIG. 1 is a fragmentary, diagrammatic perspective view of the table of a letter feeding and letter sealing machine.
Figure 2:
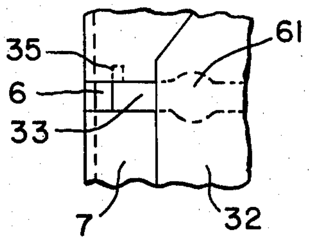
FIG. 2 is a fragmentary, diagrammatic top plan view of a portion of the guide of the adjustable well wall.

Referring now particularly to the three figures of the drawing, it is seen that the well for receiving a stack of letters is formed by two fixed walls 1, 2 and an adjustable well side 3 with a stop 4. The well side 3 is an angular part, having an angle which is less than 90° so that the well for placement of a stack of letters has a conical aperture on that side. The leg 32 of the well side 3, which slides on the table 7 for adjustment, has a guide slot 31 formed therein. The stop 4 is guided in this guide slot 31, so that it is movebly fastened such as by setscrews, for instance. The leg 32 of the well side 3 has at the end thereof opposite the guide slot 31, two angled-off webs 33, 34, each having a projection 35, 36. These webs 33, 34 are each guided in a slot 5, 6, respectively, formed in the table 7. A pin 81 with a washer 82 attached to the screw element 8 serves for guiding and locking the well side 3 by clamping. In locking the well side 3, the stop 4 is also held in its position by pressing the leg 32 against the table 7.

Figure 3:
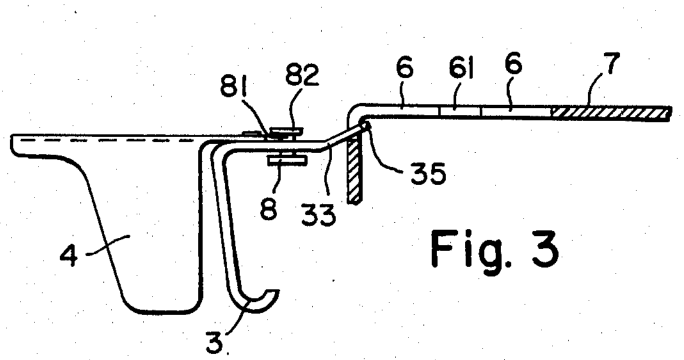
FIG. 3 is a cross-sectional view through the table along a guide slot with the well walls folded down.

The slot 6, in which the pin 81 is guided, is expanded at one point to form a hole 61 which is larger than the washer 82. After the screw element 8 is detached and the well side 3 is moved up to the point at which the washer 82 is opposite the hole 61, the well side 3 with the stop 4 can be folded down below the level of the table as shown in FIG. 3. The projections 35, 36 prevent the side 3 with the stop 4 from sliding out of the slots 5, 6.

In order to remove the well side 3 with the stop 4 from the table 7, the well side 3 with its web 33 must be brought to the hole 61 after the washer 82 is brought to the hole 61, and the web 33 must be lifted by tilting it out of the slot 6. By tilting the well side 3, the projection 36 of the web 34 is released and the well side 3 with the stop 4 is detached from the table 7.

There are claimed:

1. Movable, hinged and removable well sides for letter feeding and letter sealing machines, comprising a table having first guide slots formed therein, an angular well side having a leg with two ends and a second guide slot formed in vicinity of an end of said leg, a stop forming another well side and being guidable at least partially in said second slot at a right angle to said leg, two angled-off webs being integral with an end of said leg opposite said second guide slot, projections being integral with said webs and guidable in said first guide slots, and a screw element being attached to said leg and having a pin and a washer for guiding and locking said angular well side and said stop on said table, said table having a hole formed therein along one of said first guide slots through which said washer is liftable for folding down said angular well side and said stop and through which said web is liftable for removing said angular well side and said stop.

2. Well sides according to claim 1, wherein said leg is extended from said angular well side at an angle of less than 90°.

* * * * *